United States Patent [19]

Cook et al.

[11] Patent Number: 5,716,147

[45] Date of Patent: Feb. 10, 1998

[54] CORROSION-RESISTANT BEARING ASSEMBLY

[75] Inventors: John P. Cook, Naperville; James P. Johnson, St. Charles, both of Ill.

[73] Assignee: Emerson Power Transmission Corp., Aurora, Ill.

[21] Appl. No.: 796,288

[22] Filed: Feb. 7, 1997

[51] Int. Cl.[6] .................. F16C 33/62; F16C 33/72
[52] U.S. Cl. .............. 384/492; 384/484; 384/513; 384/569
[58] Field of Search ................ 384/492, 513, 384/516, 515, 537, 484, 569, 625

[56] References Cited

U.S. PATENT DOCUMENTS

| | | | |
|---|---|---|---|
| 2,370,173 | 2/1945 | Kendall | 384/513 |
| 2,845,311 | 7/1958 | Cobb | 384/569 |
| 3,640,592 | 2/1972 | Howe, Jr. | 384/516 |
| 4,015,884 | 4/1977 | Bertram et al. | 384/569 X |

*Primary Examiner*—Thomas R. Hannon
*Attorney, Agent, or Firm*—Leydig, Voit & Mayer, Ltd.

[57] ABSTRACT

A corrosion-resistant bearing assembly comprising inner and outer bearing races with a plurality of roller elements interposed therebetween. The inner and outer bearing races each have a bi-metallic construction which includes an outer body portion formed of a corrosion-resistant metal alloy, such as stainless steel, and a roller raceway defining insert formed of hardened, high-carbon steel. The bearing races, thereby, are substantially resistant to corrosive effects of contaminants in the outside environment, while providing hardened raceways for long-term bearing life.

17 Claims, 1 Drawing Sheet

CORROSION-RESISTANT BEARING ASSEMBLY

FIELD OF THE INVENTION

The present invention relates generally to roller bearing assemblies, and more particularly, to roller bearing assemblies having inner and outer races with hardened roller raceways for extended bearing life.

BACKGROUND OF THE INVENTION

Because the inner and outer races of roller bearing assemblies are subjected to relatively high bearing stresses during usage, it is desirable to harden the roller raceways to improve bearing life. This commonly is accomplished by forming the bearing races out of high-carbon, bearing-grade steel and wear hardening the raceway areas, such as by heat treatment.

Such steel bearing races, however, are highly corrosive, particularly when the bearing assemblies are operated in environments subject to corrosive chemicals. Efforts to overcome the corrosion problem by forming the bearing races from a corrosion-resistant metal alloy, such as polished stainless steel, have not been successful since corrosion-resistant steel cannot be hardened to the extent necessary for satisfactory bearing life.

OBJECTS AND SUMMARY OF THE INVENTION

It is an object of the present invention to provide a bearing assembly having hardened bearing races and which can be used in contaminated work environments without harmful corrosion.

Another object is to provide a bearing assembly as characterized above which has inner and outer bearing races formed of a corrosion-resistant alloy metal.

A further object is to provide a bearing assembly of the above kind in which the bearing raceways are defined by hardened inserts in the inner and outer races which are protected from corrosive chemicals.

Still another object is to provide a bearing assembly of the foregoing type which is relatively simple in design and economical to manufacture.

Other objects and advantages of the invention will become apparent upon reading the following detailed description and upon reference to the drawings, in which:

Figure 1:
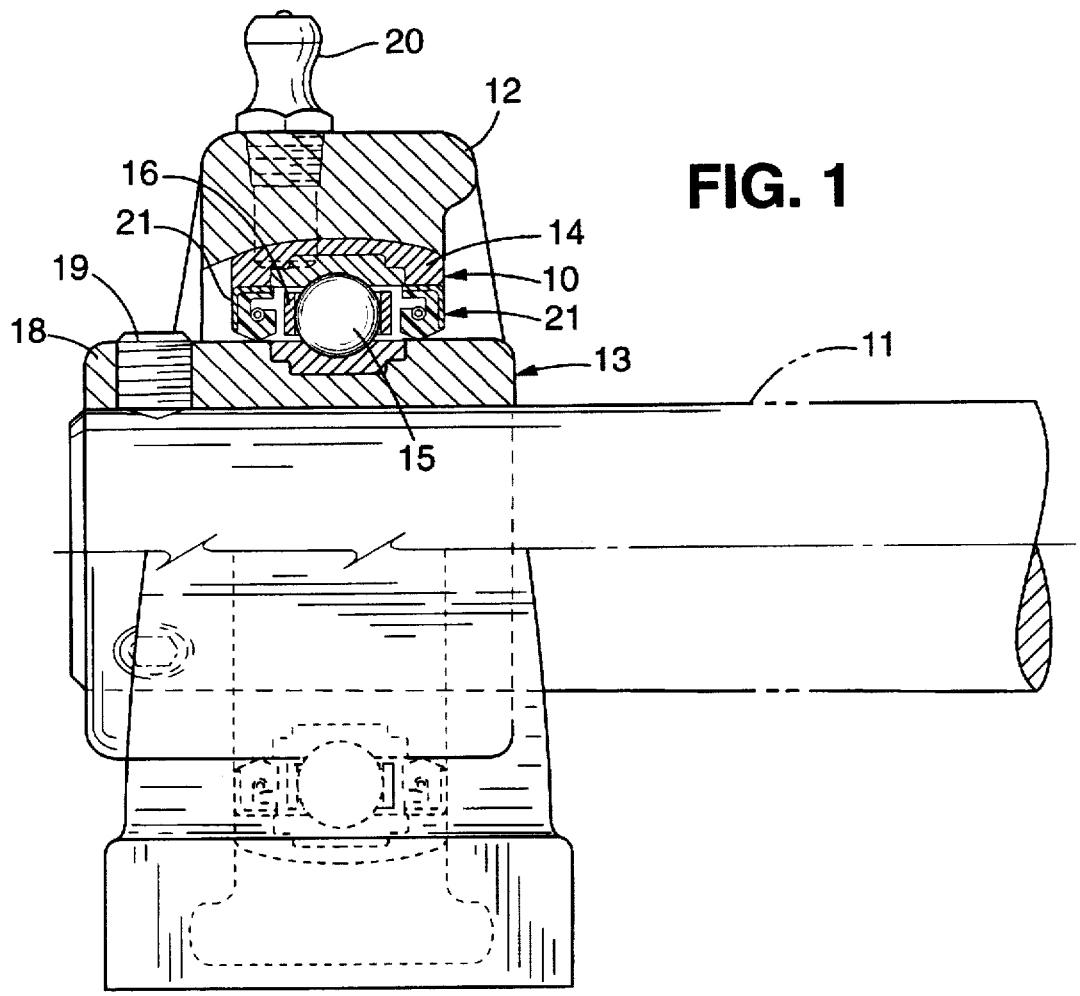
FIG. 1 is a side elevational view, in partial section, of an illustrated bearing assembly embodying the present invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

Referring now more particularly to the drawings, there is shown an illustrative bearing assembly 10 supporting the end of a rotary shaft 11 and retained within a conventional housing or pillow block 12. The bearing assembly 10 includes an annular inner race 13, an annular outer race 14, and a plurality of balls or roller elements 15 interposed therebetween. The roller elements 15 in this case are disposed in roller element pockets of a conventional cage 16.

In order to secure the bearing assembly 10 on the shaft 11, the inner race 13 has an axial extension 18 formed with one or more threaded apertures through which respective set screws 19 may be advanced into secure engaging relation with the shaft 11. A grease fitting 20 is supported by the housing 12 for directing grease through the outer race 14 to lubricate the roller elements 15.

For sealing opposed axial sides of the bearing assembly 10, seals 21 are interposed between the inner and outer races 13, 14 on opposite axial sides of the roller elements 15. The seals 21 in this case are spring lip seals of a conventional type, each comprising an annular seal body 22 molded of rubber or like resilient material within an annular metal retainer 24. Each retainer 24 is press fit within the outer bearing race 14 and the seal body 22 is formed with a V-shaped lip 25 for sealingly engaging the outer perimeter of the inner race 13. A garter spring 26 provides an inwardly directed radial load on the seal body 22 to enhance its sealing effectiveness. By virtue of such arrangement, it can be seen that the inner bearing race 13, outer bearing race 14, and seals 21 define a sealed chamber 28 within which the rolling elements 15 and cage 16 are protectively contained from the outside environment.

In accordance with the invention, the inner and outer bearing races are made of a corrosion-resistant metal alloy for protecting the races against corrosive contaminants in the outside environment and have roller raceway defining inserts formed of hardened, bearing-grade steel for long term reliable wear. To this end, in the illustrated embodiment, the bearing races 13, 14 each have a bi-metallic construction comprising an outer body portion 30, 31, respectively, formed of corrosion-resistant metal alloy and an insert 34, 35, respectively, which defines a roller raceway 34a, 35a formed of a hardened metal suitable for withstanding the high bearing stresses created by the relatively movable roller elements 15. The bearing race bodies 30, 31 may be formed of a corrosion-resistant alloy metal, such as a stainless steel which has about 18 percent chromium and 8 percent nickel composition. The raceway defining inserts 34, 35, on the other hand, may be formed of a hardened, high-carbon, bearing-grade steel.

Figure 2:
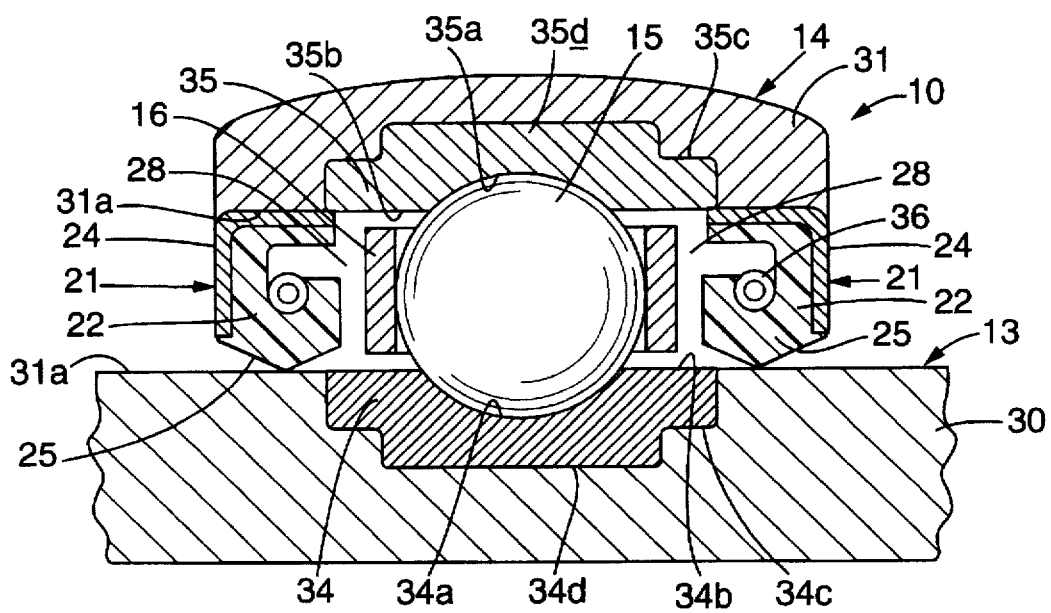
FIG. 2 is an enlarged fragmentary section of the bearing assembly shown in FIG. 1.

In keeping with the invention, the raceway defining inserts 34, 35 are protectively contained within the bearing assembly from the corrosive effects of contaminants in the outside environment. As best shown in FIG. 2, each bearing insert 34, 35 is inset within the respective body portion 30, 31 such that only a face 34b, 35b formed with the roller raceway 34a, 35a is exposed. The exposed faces 34b, 35b of the inserts 34, 35 are substantially co-planar with a respective cylindrical surface 30a, 31a of the bearing race bodies 30, 31 and is located entirely within the sealed chamber 28 so as to be protected from contaminants in the outside environment.

To facilitate secure retainment of the inserts 34, 35 within the bearing race bodies 30, 31 and to further protect the inserts from contaminants, each bearing race insert 34, 35 has a stepped side 28, 29 disposed within correspondingly configured recess in the bearing race bodies 14a, 15a. The bearing race inserts 14b, 15b in this instance each have a stepped outer surface defined by a respective centrally located, radial extending portion 34d, 35d. The radial extending portion 28a, 29a of each insert 34, 35 preferably has an axial length greater than the axial length of the roller elements, in this case greater than the diameter of the balls 15, so as to maximize the radial thickness and strength of the insert in the immediate vicinity of the roller raceways 34a, 35a which incur maximum stresses.

It will be understood by one skilled in the art that the bi-metallic bearing races 13, 14 may be economically produced by various manufacturing methods. For example, the corrosion-resistant body portions can be molded in overlaid fashion to the inserts, or alternatively, can be formed by pressure molding and sintering or brazing powdered stainless steel about the inserts.

From the foregoing, it can be seen that the bearing assembly of the present invention has inner and outer bearing races which are substantially resistant to the corrosive effects of contaminants in the outside environment, while yet providing hardened bearing raceways necessary to withstand high stresses imparted by the roller elements during usage. The bearing assembly, accordingly, is adapted for long term reliable operation in contaminated work environments. The bearing assembly further is of relatively simple construction and lends itself to economical manufacture.

What is claimed is:

1. A bearing assembly comprising an inner race for mounting on a shaft, an outer race disposed concentrically about said inner race, a plurality of roller elements interposed between said inner and outer races, seals cooperating with said inner and outer races on opposite axial sides of said roller elements, said inner and outer races each comprising a body portion formed of a corrosion-resistant metal and an insert formed of hardened metal different from the metal of said body portions, and said inserts each being formed with a raceway for said rollers.

2. The bearing assembly of claim 1 in which said bearing race bodies are formed of stainless steel.

3. The bearing assembly of claim 2 in which said bearing race inserts are formed of high-carbon, bearing-grade steel.

4. The bearing assembly of claim 1 in which said inserts are axially located between said seals.

5. The bearing assembly of claim 1 in which said inserts each are secured within the respective body portion with a single exposed cylindrical surface within which the raceway is formed.

6. The bearing assembly of claim 5 in which said inner race body portion has an outer cylindrical surface and said outer race body portion has an inner cylindrical surface, and said exposed surfaces of bearing race inserts are in concentric substantially co-planar relation to the cylindrical surfaces of the respective body portions.

7. The bearing assembly of claim 5 in which said inner and outer bearing races and said seals define a sealed chamber, and the exposed surface of said bearing race inserts are disposed entirely within said sealed chamber.

8. The bearing assembly of claim 5 in which said inserts each have a stepped outer surface opposite the exposed surface, and said stepped surface of each insert being mounted within a recess of the respective body portion.

9. The bearing assembly of claim 8 in which said inserts each have a stepped surface defined by a centrally located, radial extending portion.

10. The bearing assembly of claim 9 in which the radial portion of each bearing race insert has an axial length longer than the axial length of the roller elements.

11. The bearing assembly of claim 9 in which the roller elements are balls, and said radial portion of each insert has an axial length greater than the diameter of the balls.

12. The bearing assembly of claim 1 in which said inner and outer bearing race bodies each is formed with a recess within which the respective one of said inserts is mounted.

13. A bearing assembly comprising an inner race for mounting on a shaft, an outer race disposed concentrically about said inner race, a plurality of roller elements interposed between said inner and outer races, seals cooperating with said inner and outer races on opposite axial sides of said roller elements for preventing the ingress of contaminants from the outside environment to the roller elements, and said bearing races each having a bi-metallic construction consisting of a body portion formed of a corrosion-resistant metal and an insert which defines a roller raceway formed of a hardened different metal than said body portions.

14. The bearing assembly of claim 13 in which said inserts are axially located between said seals.

15. The bearing assembly of claim 13 in which said inner and outer races and said seals define a sealed chamber, said bearing race inserts each having a surface which defines a roller raceway disposed within said sealed chamber.

16. The bearing assembly of claim 15 in which said inner and outer bearing race bodies each is formed with a recess within which the respective one of said inserts is mounted.

17. The bearing assembly of claim 16 in which said inserts each have a stepped outer surface opposite the exposed surface, and said stepped surface of each insert bearing mounted within a recess of the respective body portion.

* * * * *